United States Patent
Hermon et al.

(10) Patent No.: US 7,775,543 B2
(45) Date of Patent: Aug. 17, 2010

(54) RECREATIONAL VEHICLE

(75) Inventors: Christopher J. Hermon, Goshen, IN (US); Robert W. Martin, Bristol, IN (US); Jeffrey M. Snyder, Goshen, IN (US)

(73) Assignee: Thor Tech, Inc., Saginaw, MI (US)

( * ) Notice: Subject to any disclaimer, the term of this patent is extended or adjusted under 35 U.S.C. 154(b) by 0 days.

(21) Appl. No.: 12/358,731

(22) Filed: Jan. 23, 2009

(65) Prior Publication Data

US 2009/0127821 A1    May 21, 2009

Related U.S. Application Data

(63) Continuation of application No. 11/240,813, filed on Sep. 30, 2005, now Pat. No. 7,500,690.

(51) Int. Cl.
*G02B 5/08* (2006.01)
(52) U.S. Cl. ........................ 280/477; 359/844
(58) Field of Classification Search ............... 280/477; 359/844
See application file for complete search history.

(56) References Cited

U.S. PATENT DOCUMENTS

| | | | |
|---|---|---|---|
| 3,005,089 A | 10/1961 | Robins | |
| 3,868,176 A | 2/1975 | Young | |
| 4,163,606 A | 8/1979 | Granno | |
| 4,931,768 A * | 6/1990 | Jincks et al. | 340/473 |
| 5,235,468 A | 8/1993 | Stephens | |
| 5,309,289 A | 5/1994 | Johnson | |
| 5,482,310 A | 1/1996 | Staggs | |
| 5,784,213 A | 7/1998 | Howard | |
| 5,797,614 A | 8/1998 | Hord et al. | |
| 6,024,372 A | 2/2000 | Colibert et al. | |
| 6,062,697 A | 5/2000 | Bryant et al. | |
| 6,079,837 A | 6/2000 | Singleton | |
| 6,252,497 B1 | 6/2001 | Dupay et al. | |
| 6,450,667 B1 * | 9/2002 | Thompson | 362/263 |
| 6,499,851 B1 | 12/2002 | Kelly et al. | |
| 6,592,230 B2 | 7/2003 | Dupay | |
| 6,612,603 B2 | 9/2003 | Alger | |
| 6,619,685 B2 | 9/2003 | Teague | |
| 6,685,348 B2 * | 2/2004 | Pastrick et al. | 362/494 |
| 6,900,724 B2 | 5/2005 | Johnson | |
| 6,923,463 B1 | 8/2005 | Ford et al. | |
| 6,955,437 B1 | 10/2005 | Roberts | |

FOREIGN PATENT DOCUMENTS

DE    3113266 A1    5/1982

* cited by examiner

*Primary Examiner*—Kevin Hurley
(74) *Attorney, Agent, or Firm*—Dinsmore & Shohl LLP

(57) ABSTRACT

A trailer of the type that is intended to be towed with a towing vehicle has a trailer body with an elevated front portion. The towing vehicle has a vehicle hitch assembly, and the trailer body has an elevated front portion, with a mounting arrangement extending downward from beneath the front portion. A reflector is integral with the front portion of the trailer body. The reflector faces forward and downward such that the driver of the towing vehicle may view the reflection of the vehicle hitch assembly and the mounting arrangement extending from the trailer body as the towing vehicle is backed up. This facilitates positioning the towing vehicle for connection to said trailer.

18 Claims, 3 Drawing Sheets

RECREATIONAL VEHICLE

CROSS-REFERENCE TO RELATED APPLICATIONS

This application is a continuation of U.S. patent application Ser. No. 11/240,813, filed Sep. 30, 2005 now U.S. Pat. No. 7,500,690.

STATEMENT REGARDING FEDERALLY SPONSORED RESEARCH OR DEVELOPMENT

Not applicable.

BACKGROUND OF THE INVENTION

Fifth wheel trailers have been used extensively for many years because of a number of advantages that such trailers offers over other types of trailers. In particular, fifth wheel trailers permit somewhat heavier loads to be towed safely. Additionally, such trailers track quite well behind the towing vehicle, even when adverse road conditions are encountered. Finally, fifth wheel travel trailers provide a great deal of useable interior room.

Fifth wheel trailers have become popular in recent years in the travel trailer industry. A conventional fifth wheel travel trailer is specifically designed to be towed by a pick up truck or by a flat bed truck. The front end of such a trailer is elevated above the bed of the truck. The trailer includes a mounting portion, sometimes referred to as a kingpin, that extends downward from beneath the elevated part of the trailer and engages a trailer hitch that is secured to the bed of the pick up truck directly over the rear wheels of the truck. This fifth wheel hitch arrangement has the advantage that a significant portion of the weight of the trailer is applied to the truck bed over the truck's rear wheels, increasing the traction that can be obtained by the truck. This, in turn, produces a towing combination of truck and trailer which handles well during towing, minimizing sway, and which backs up with relative ease. Further, the two level design of the trailer results in an elevated forward portion that is advantageously used as a bedroom area.

The fifth wheel trailer design, however, is not without its disadvantages. While it is relatively easy to connect and disconnect from the truck, backing the truck into position prior to connecting to the truck bed hitch can be difficult, especially if a driver is maneuvering the truck without assistance from someone standing near the rear of the truck, giving the driver directions. There is a need for a fifth wheel trailer in which the process of connecting the trailer to the hitch carried by the tow vehicle is facilitated.

SUMMARY OF THE INVENTION

This need is met by a trailer constructed according to the present invention. The trailer is intended to be towed with a towing vehicle having a vehicle hitch assembly. The trailer includes a trailer body having an elevated front portion, with a mounting arrangement extending downward from beneath the front portion. The trailer further includes a reflector that is integral with the front portion of the trailer body. The reflector faces forward and downward such that the driver of a towing vehicle may view the reflection of the vehicle hitch assembly and the reflection of the mounting arrangement extending from the trailer body as the towing vehicle is backed up. This facilitates positioning the towing vehicle for connection to the trailer.

The reflector may define a surface having a layer of reflective material. The layer of reflective material may comprise a layer of reflective film adhesively secured to the trailer body. Alternatively, the reflector may comprise a metal plate having a mirrored surface. The reflector extends across at least half of the width of the front of the trailer, and may be planar, concave or convex.

The trailer may be a fifth wheel trailer and the towing vehicle may be a truck, such as for example a pick up truck or a flat bed truck. The trailer may further comprise lights on the front portion of the trailer body, such that the hitch and the mounting arrangement may be illuminated during the connection of the trailer to the towing vehicle.

Accordingly, it is an object of the present invention to provide an improved trailer which facilitates hitching the trailer to a towing vehicle. Other objects and advantages of the invention will be apparent from the following description, the accompanying drawings, and the appended claims.

DETAILED DESCRIPTION OF THE PREFERRED EMBODIMENT

Figure 1:
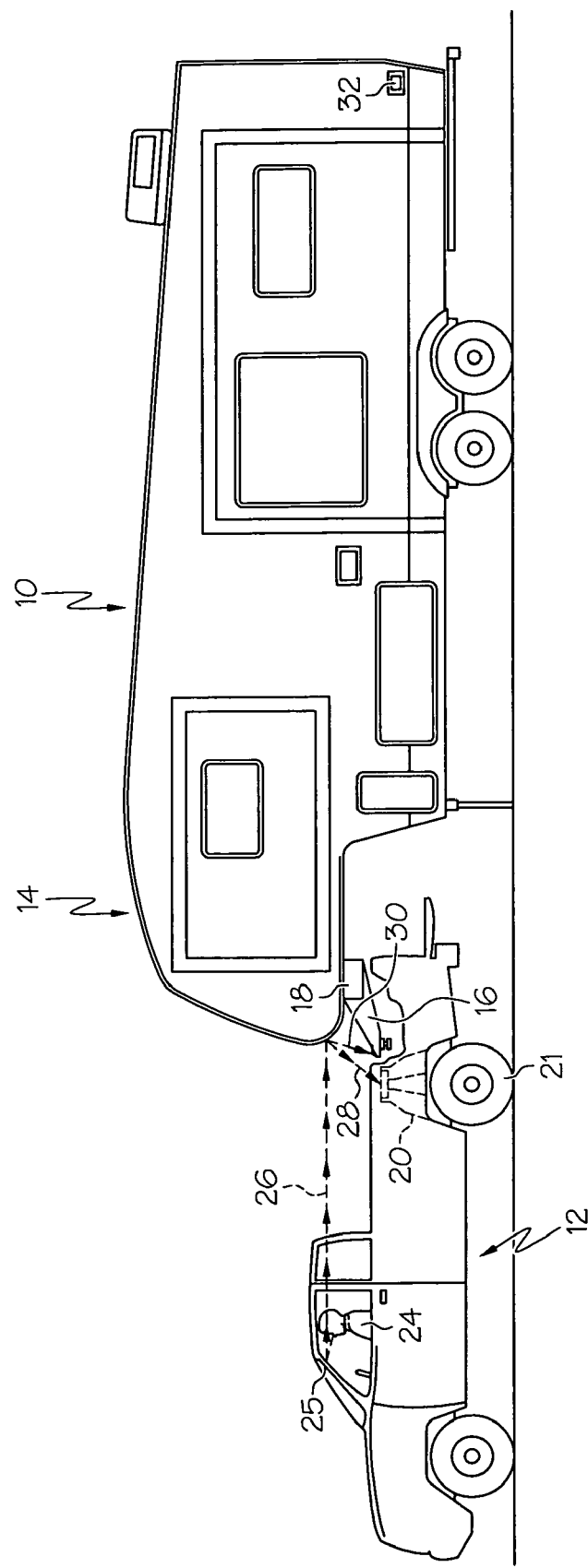
FIG. 1 is a side view of a trailer and a pick up truck as a towing vehicle according to the present invention, with a portion of the back of the truck broken away.
Figure 2:
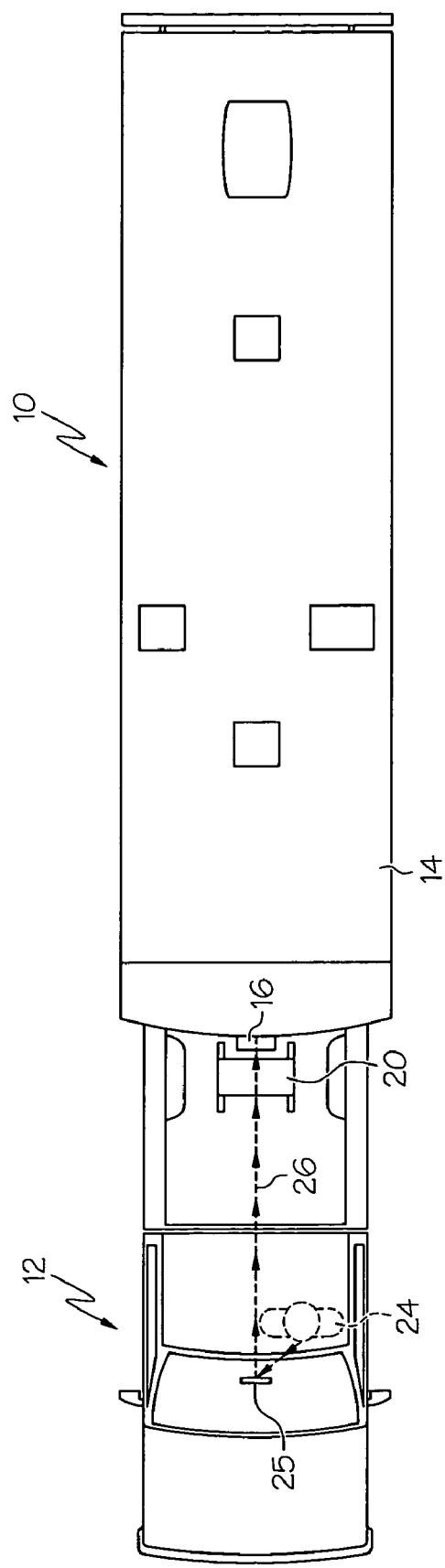
FIG. 2 is a top view of the trailer and towing vehicle of FIG. 1.
Figure 3:
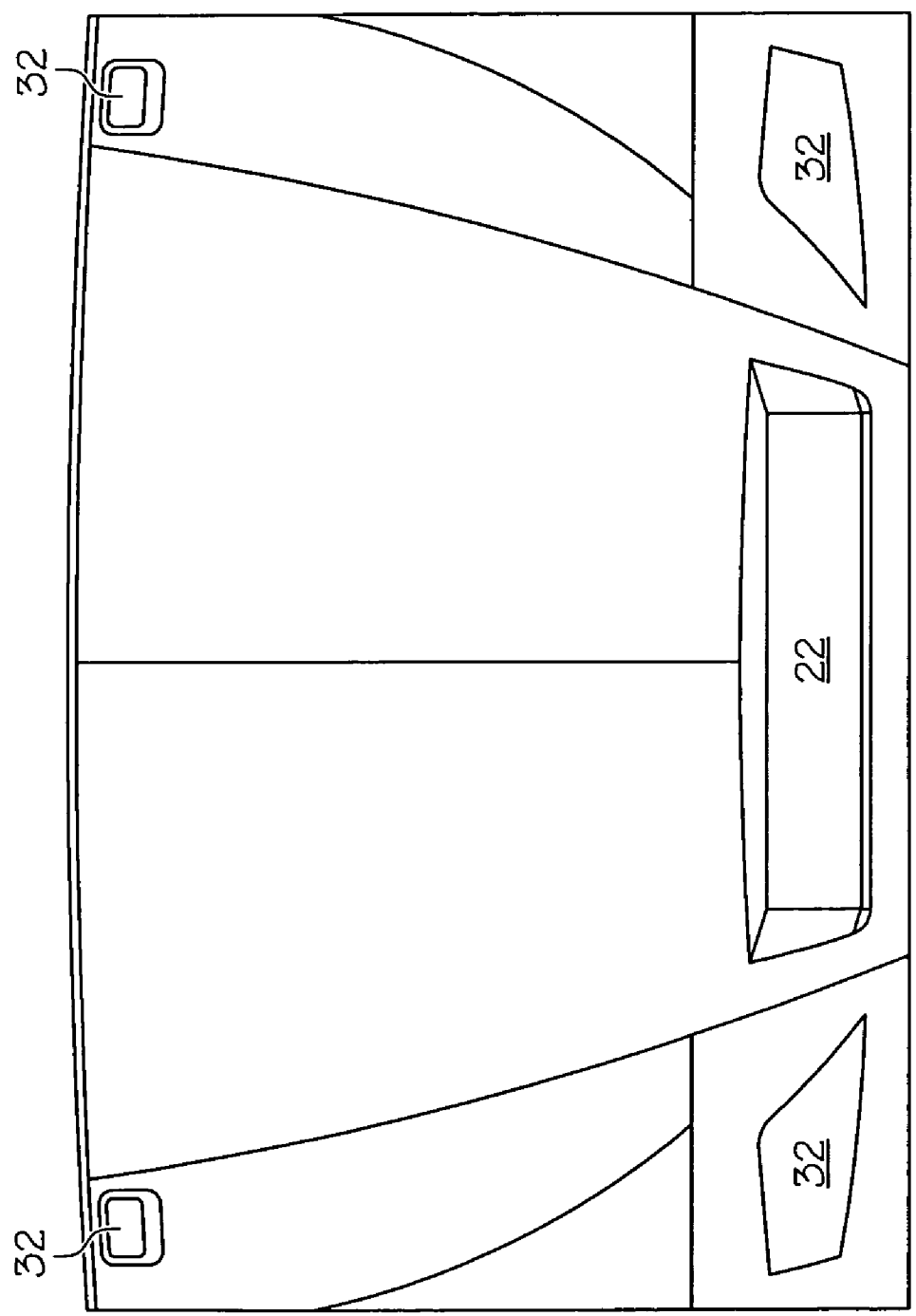
FIG. 3 is a view of the front end cap of the trailer body, as seen looking from left to right in FIG. 1.

Reference is made to FIGS. 1-3 which illustrate a trailer 10, and the combination of the trailer 10 and a towing vehicle 12, constructed according to the present invention. The towing vehicle 10 may comprise a pick up truck, as shown, or a flat bed truck, or another suitable type of truck. The trailer 10 is a fifth wheel trailer of the type that includes a trailer body having an elevated front portion 14. The trailer has a mounting arrangement 16, including a fifth wheel pin box 18 extending downward from beneath the front portion 14. The towing vehicle has a hitch assembly 20 mounted on the bed of the truck 12 and secured to the truck generally above and between the rear wheels 21 of the truck 12. When the mounting arrangement 16 is secured to the hitch 20, the truck 12 will support a significant portion of the weight of the trailer 10. This enhances the traction achieved with the rear wheels of the truck 12, and produces a truck and trailer combination that handles and performs very well.

As best seen in FIG. 3, the trailer body has a front end cap which may be molded of a polymer material or fabricated from aluminum or other metal material. The front end cap includes a reflector 22 that is integral with the front portion of the trailer body. The reflector is "integral" in the sense that it is mounted on the trailer body surface, and does not extend outward from the body, thereby reducing the likelihood that it might be damaged in use. The reflector 22 faces forward and downward such that the driver of the towing vehicle 12, indicated at 24, may view the reflection of the vehicle hitch assembly 20 and the mounting arrangement 16 extending from the trailer body as the towing vehicle is backed up. In this manner, positioning the towing vehicle 12 for connection to the trailer 10 is facilitated. Although a front end cap is shown in FIG. 3, it will be appreciated that the instant invention is not limited to those trailers that are constructed with a front end cap. Some trailers of this type are constructed without a cap, but rather with a sheet of appropriate material simply wrapped over the front portion of the trailer body. In such instances, the reflector 22 is simply mounted on the whatever structure forms the front portion of the trailer body, facing forward and downward.

The reflector 22 may be constructed in any of a number of ways. For example, the reflector 22 may be a planar or curved surface having a layer of reflective material. The reflective material can be a layer of reflective film adhesively secured to the front end cap of the trailer body. Alternatively, the reflector 22 may comprise a metal plate having a polished, mirror-like surface. The metal plate may be coated with a chrome material or other highly reflective material to produce a mirror effect. The metal plate may be attached to the body of the trailer with an adhesive. Alternatively, the plate may be attached to the body of the trailer with screws or rivets, or other mechanical attachment mechanisms. Alternatively, the reflector 22 may comprise a mirror made of a coated glass plate, or a coated plastic plate. The reflector 22 is shown as extending across at more than half of the width of the front of the trailer 10. It should be understood, however, that reflectors of various widths may be used. The width of the reflector 22 will be selected based on the desired extent of view, and can range from very narrow to nearly the entire width of the trailer.

As will be apparent, the reflector 22 is flush with the front portion of the trailer body, such that it does not interfere with the movement of the truck 12 into position. The reflector 22 faces forward and downward such that the driver 24 of the truck 12 may view the reflection of the vehicle hitch assembly 20 and the reflection of the mounting arrangement 16. As seen in FIG. 3, the driver 24 observes the hitch 20 in the rear view mirror 25 along sight lines 26 and 28. At the same time, the driver 24 observes the mounting arrangement 16 in the rear view mirror 25 along the sight lines 26 and 30. The reflector 22 may be planar, or curved, either concave or convex, depending upon the desired optical characteristics. For example, a wider field of view may be produced by a reflector that is convex in shape, although image distortions will also result.

The trailer 10 may further include lights 32 on the front portion of the trailer body. The lights are directed generally downward, thereby illuminating the hitch 20 and the mounting arrangement 16. This will facilitate the connection of the trailer to the towing vehicle at night or in adverse weather conditions. Additional running lights 34 may also be provided on the trailer 10.

While certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A trailer intended to be towed with a towing vehicle, said towing vehicle having a vehicle hitch assembly, comprising:
    a trailer body having an elevated front portion, with a mounting arrangement extending downward from beneath said front portion, and
    a reflector, integral with the front portion of the trailer body, said reflector facing forward and downward such that the driver of a towing vehicle may view the reflection of said vehicle hitch assembly and said mounting arrangement extending from the trailer body as the towing vehicle is backed up, such that positioning the towing vehicle for connection to said trailer is facilitated, said reflector being mounted on the trailer body surface and not extending outward from the surface such that the likelihood of damage to the reflector in use is reduced.

2. The trailer according to claim 1, in which said reflector includes a surface having a layer of reflective material.

3. The trailer according to claim 1, in which said trailer body includes a front end cap of polymer material.

4. The trailer according to claim 1, in which said reflector is mounted on the trailer body by means of an adhesive.

5. The trailer according to claim 1, in which said reflector comprises a metal plate having a polished surface.

6. The trailer according to claim 1, in which said reflector is attached to the body with mechanical attachment mechanisms.

7. The trailer according to claim 1, in which said reflector comprises a metal plate having a mirrored surface.

8. The trailer according to claim 1, in which said reflector comprises a coated glass plate.

9. The trailer according to claim 1, in which said reflector comprises a coated plastic plate.

10. A combination of a trailer and a towing vehicle, comprising:
    a towing vehicle including a truck,
    a vehicle hitch assembly secured to said truck generally above the rear wheels of said truck,
    a trailer having a trailer body defining an elevated front portion, and further including a mounting arrangement extending downward from beneath said front portion engaging said hitch assembly, and
    a reflector integral with the front portion of said trailer body, said reflector facing forward and downward such that the driver of said truck may view the reflection of said vehicle hitch assembly and said mounting arrangement, thereby aiding the driver in positioning the towing vehicle for connection to said trailer, said reflector being mounted on the trailer body surface and not extending outward from the surface such that the likelihood of damage to the reflector in use is reduced.

11. The trailer according to claim 10, in which said reflector includes a surface have a layer of reflective material.

12. The trailer according to claim 10, in which said trailer body includes a front end cap of polymer material.

13. The trailer according to claim 10, in which said reflector is mounted on the trailer body by means of an adhesive.

14. The trailer according to claim 10, in which said reflector comprises a metal plate having a polished surface.

15. The trailer according to claim 10, in which said reflector is attached to said body with one or more mechanical attachment mechanisms.

16. The trailer according to claim 10, in which said reflector comprises a metal plate having a mirrored surface.

17. The trailer according to claim 10, in which said reflector comprises a coated glass plate.

18. The trailer according to claim 10, in which said reflector comprises a coated plastic plate.

* * * * *